United States Patent
Del Vecchio

[11] 3,791,335
[45] Feb. 12, 1974

[54] SELF-PROPELLED WATER RECREATIONAL VEHICLE

[76] Inventor: Michael Del Vecchio, 140 Regent Ave., Providence, R.I. 02915

[22] Filed: July 12, 1972

[21] Appl. No.: 271,113

[52] U.S. Cl. ................................................ 115/70
[51] Int. Cl............................................. B63b 35/00
[58] Field of Search...... 115/70; 114/66.5 P, 66.5 H

[56] References Cited
UNITED STATES PATENTS
| | | | |
|---|---|---|---|
| 3,710,750 | 1/1973 | Welsh | 115/70 |
| 3,373,715 | 3/1968 | Stacey | 115/70 |

Primary Examiner—Trygve M. Blix
Assistant Examiner—Donald W. Underwood
Attorney, Agent, or Firm—Salter & Michaelson

[57] ABSTRACT

A self-propelled recreational vehicle for use in water and including spaced skis that are interconnected for pivotal movement, the pivotal movement of the skis being accomplished by a steering mechanism interconnected thereto; and a motor assembly mounted on a support to which the skis are interconnected and extending between the skis to provide the propelling movement for the device.

9 Claims, 10 Drawing Figures

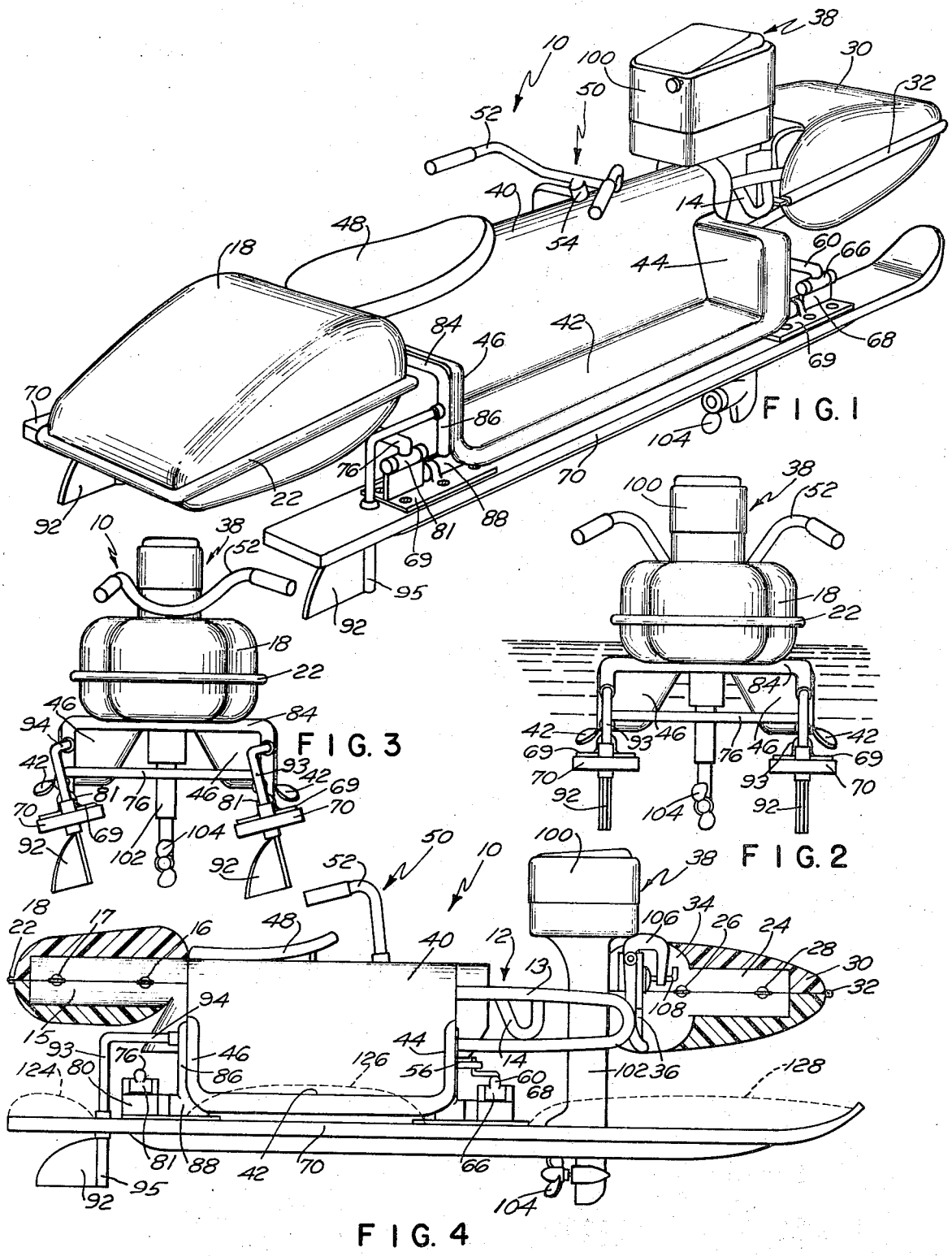

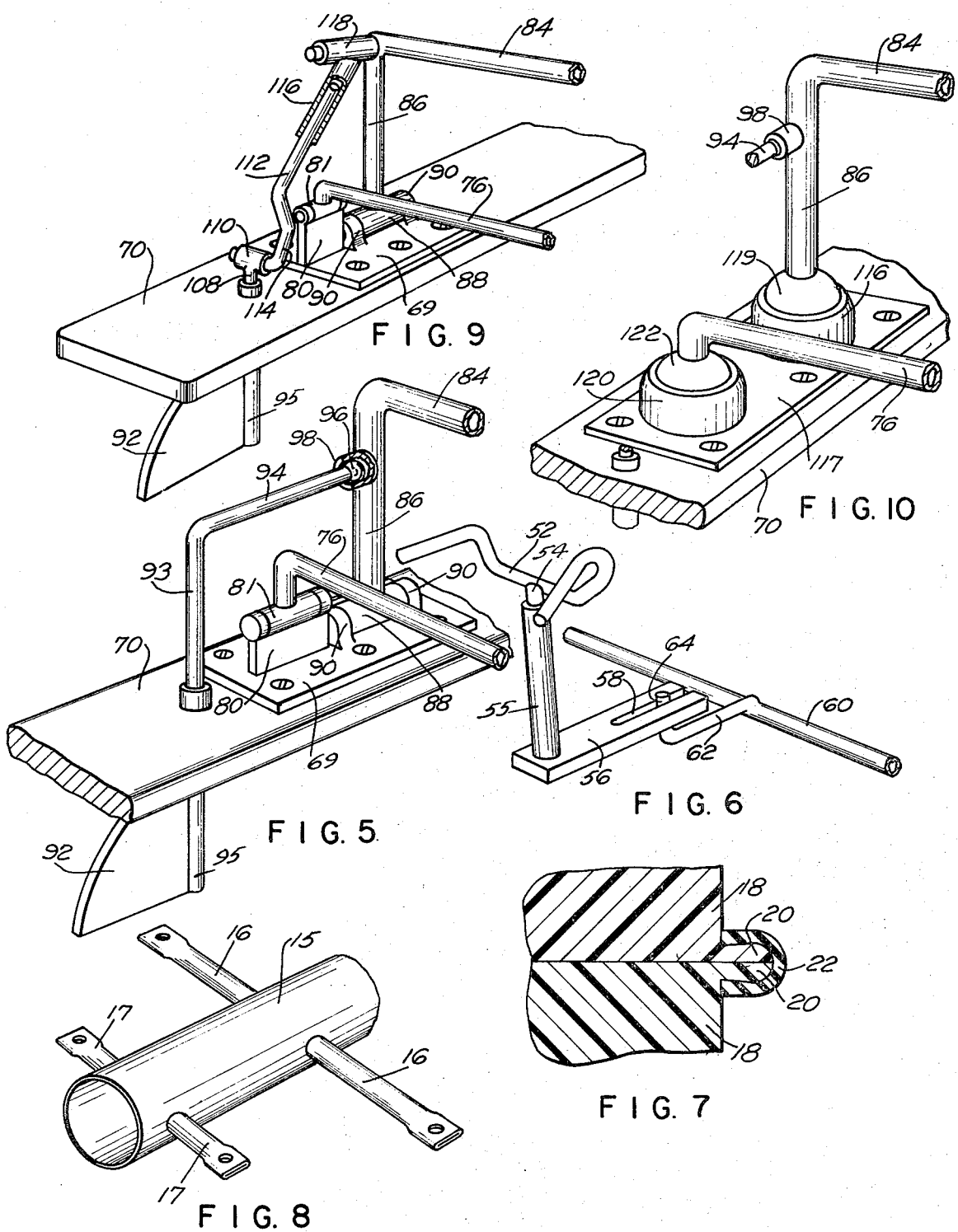

SELF-PROPELLED WATER RECREATIONAL VEHICLE

BACKGROUND OF THE INVENTION

The present invention is designed for use as an aquatic recreational vehicle and, as contrasted with the tow-type of aquatic device, is provided with a motor that enables the vehicle to be self-propelled.

Aquatic devices for recreational use have taken various forms heretofore, the usual type of self-propelled vehicle being the conventional boat which may include either an inboard or outboard motor having a rearwardly directed propeller. Various types of skis, sled boards and discs of the non-propelled variety are well-known in the art; but such devices rely for propulsion on towing and thus are limited in the use thereof. In the prior known recreational aquatic vehicles that have included some form of a motor or the like and that were not of the conventional boat construction, the body portion of the device was normally formed as an integral or one-piece hull; and as a result, steering of this form of vehicle was accomplished with pivotal movement of the propelling means or by some form of a rudder that was interconnected to the propelling means. Although the prior known water recreational vehicles other than the conventional boat have found some favor in use, they have either been too light for practical use or fairly complex in construction; and as a result, they were prohibitive in cost.

SUMMARY OF THE INVENTION

The present invention relates to a new form of aquatic recreational vehicle and includes spaced skis on which a support is mounted, the skis being pivotally movable with respect to the support. Floats are provided for buoyantly locating the vehicle in a non-submerged position when it is at rest, and the aquatic vehicle also includes a motor for propelling the vehicle. A steering mechanism is interconnected to the skis which enables the occupant of the device to conveniently pivot the skis in a steering action, the steering movement of the vehicle being stabilized by rudders that are mounted at the rear of the skis and that are responsive to the steering action of the skis through a unique linkage arrangement.

Accordingly, it is an object of the present invention to provide a self-propelled aquatic recreational vehicle that includes pivotally mounted skis for supporting a motor assembly and occupant.

Another object of the invention is to provide a self-propelled aquatic device having buoyant elements for the support thereof when the device is at rest and including a motor assembly that provides for the propelling movement of the device in water.

Still another object of the invention is to provide a self-propelled aquatic vehicle that includes spaced skis to which a steering mechanism is interconnected, the steering mechanism being movable by an occupant to pivotally turn the skis during a turning movement of the vehicle, and a stabilizing rudder being mounted on each of the skis and being movable in response to the turning movement of the skis to impart a stabilizing action therefor.

Other objects features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a perspective view of the aquatic recreational vehicle embodied in the present invention;

FIG. 2 is a rear elevational view thereof when at rest;

FIG. 3 is a rear elevational view of the aquatic vehicle when in use and showing a turning movement thereof;

FIG. 4 is a side elevational view of the aquatic vehicle with parts shown in section;

FIG. 5 is an enlarged fragmentary perspective view of a rear portion of a ski showing one form of a pivotal connection for the rear cross rod and further showing one form of a connection of the rear support assembly to a stabilizing rudder;

FIG. 6 is a perspective view of the steering mechanism of the recreational vehicle;

FIG. 7 is a fragmentary sectional view of a float for supporting the vehicle and showing a bumper as mounted thereon;

FIG. 8 is a perspective view of an end member formed as part of the support frame of the vehicle;

FIG. 9 is an enlarged fragmentary perspective view similar to FIG. 5 and showing a modified form of the pivot connection for the stabilizing rudder; and FIG. 10 is an enlarged fragmentary perspective view of a modified form of the connection of the cross rods and support brackets to the skis.

DESCRIPTION OF THE INVENTION

Referring now to the drawings, and particularly to FIGS. 1 through 4, the aquatic recreational vehicle embodied in the present invention is illustrated and is generally indicated at 10. The recreational vehicle 10 includes a frame generally indicated at 12 that includes a main support 13 formed of a tubular metal material, such as aluminum, and that is provided with cross members 14 along the length thereof that contribute to the strength thereof. Joined to the rearmost portion of the frame 12 by welding is a rear tubular support member 15 (FIG. 8) to which cross arms 16 and 17 are joined, the tubular support member 15 and arms 16 and 17 receiving a float 18 thereon. The float 18 is formed in two parts of a buoyant material, such as polystyrene; and as illustrated in FIG. 7, it is formed with mating flanges 20 around which a resilient bumper 22 is secured. As seen in FIG. 4, the forward portion of the frame 12 has a tubular member 24 secured thereto by welding to which cross arms 26 and 28 are fixed. The tubular member 24 receives a float 30 therearound, the float 30 also being formed in two pieces and having a bumper 32 secured to mating flanges thereof. As illustrated in FIG. 4, an opening 34 is formed in the float 30 and receives a vertical plate 36 therein that is welded to the forward end of the main support 13 and tubular support member 24. The plate 36 defines a support for mounting of a motor assembly generally indicated at 38, as will hereinafter be described.

Mounted on the main support 13 of the frame 12 is a shield 40 that is formed in a saddle-like configuration and that extends downwardly on both sides of the main support 13 in enveloping relation, as illustrated in FIG. 4. The lowermost portions of the shield 40 terminate in foot rests 42, the foot rests 42 being located between a vertical forward wall 44 and a vertical rear wall 46. Mounted on the shield 40 and fixed to the frame 12 is a seat 48 on which an occupant of the aquatic vehicle is seated in the operation thereof; and it is understood that the seat 48 may be formed in an elongated manner, as known in the art, to accommodate at least two occupants.

Also mounted on the frame 12 for turning movement with respect thereto is a steering assembly generally indicated at 50 which as shown in FIG. 6 includes a handlebar 52 that is interconnected to a steering column 54 that projects through bearing 55 mounted on the frame 12. Joined to the lowermost end of the steering column 54 is a steering bracket 56 that is formed with an elongated slot 58 therein. A steering cross rod 60 is provided that has a pin 62 joined thereto, the pin 62 including an upwardly extending portion 64 that is received in the slot 58. The steering cross rod 60 terminates at the outer ends thereof in pivot elements 66 that are mounted for pivotal movement on blocks 68. The blocks 68 are secured to plates 69 mounted on skis 70 that are of conventional configuration and that are located in spaced apart relation. The skis 70 effectively support the frame 12 of the vehicle when the vehicle is propelled over water; and as will be described, the skis 70 are pivotally mounted with respect to the frame 12; and for this purpose are pivotally secured to support assemblies defined by the forward cross rod 60, a rear cross bar 76 and a cross bar 84. As described, the forward cross rod 60 is pivotally mounted in the pivot blocks 68 that are secured to the plates 69 that are, in turn, fixed to the skis 70, while the ends of the rear cross bar 76 are pivotally mounted on pivot member 80 fixed to blocks 81 that are adjacent to the rear end of the skis. As illustrated in FIG. 5, each block 81 is fixed to a plate 82 mounted adjacent to the rear end of a ski 70; and as will be described, the cross rods 60 and 76 are responsive to the steering action of the handlebar 52 and shifting movement of the steering cross rod 60 to pivotally move the skis 70 in a turning motion when the aquatic vehicle is to be steered. The skis 70 are interconnected to the frame 12 through the forward support assembly which includes the steering rod 60 and through the rear support assembly which includes the cross bar 84, the ends of the cross bar 84 having vertical portions 86 joined thereto. Secured to the lowermost ends of the vertical portions 86 are pivot elements 88. Each of the pivot elements 88 is mounted for pivotal movement between protuberances 90 that are formed on the plate 69, the pivot elements 88 providing for pivotal movement of the skis 70 with respect to the cross bar 84 during a steering movement of the vehicle.

In order to stabilize the turning movement of the aquatic vehicle 10, rudders 92 are mounted under the skis 70 adjacent to the rear ends thereof and are interconnected to the fixed rod 84, wherein pivotal movement of the skis 70 in a steering action will result in a corresponding pivoting movement of the rudders 92. As illustrated in FIG. 5, each rudder 92 "includes a tubular portion 95 that;" is received on a reduced portion formed on the lowermost end of the shaft 93, the shaft 93 being joined to a rod 94 at right angles thereto. Joined to the end of the rod 94 is a ball 96 that is received in a socket 98, the socket 98 being fixed to the vertical portion 86 of the cross bar 84. The ball and socket connection as defined by the ball 96 and the socket 98 provides for a rotating movement of the shaft 93 when the skis 70 are moved with respect to the cross bar 84. Thus, when the steering handlebar 52 is pivoted to the left as illustrated in FIG. 3 to effect a left turn of the vehicle, the skis 70 pivot in the manner as illustrated in FIG. 3. The rudders 92, in turn, are pivoted with respect to the movement of the skis 70 and stabilize the steering action thereof, thereby insuring that a proper turn of the vehicle is achieved.

In order to provide the propelling motion for the aquatic vehicle 10, the motor assembly 38 is mounted on the frame 12 and as illustrated in FIG. 4, the motor assembly 38 includes a housing 100 in which an internal combustion engine is located. A shaft extends through a shaft housing 102 and terminates at the lower end thereof in a drive for a propeller 104. The propeller 104 projects below the skis 70 and faces rearwardly in the conventional manner. It is seen that the motor assembly 38 projects between the skis 70 and just forwardly of the occupant of the aquatic vehicle to provide for easy access thereto. A pivotal mounting bracket 106 provided with a screw threaded fastening element 108 is secured to the vertical plate 36 of the frame 12 and is further pivotally connected to the motor housing 100 for securing the motor assembly 38 on the frame 12.

In operation of the device, the floats 18 and 30 provide the necessary buoyancy to retain the device on the surface of the water, although the skis 70 will be located under the surface of the water when the device is in the rest position. During propulsion of the device, the skis will support the device and the occupant thereon on the surface of the water, the motor assembly 38 providing the necessary propulsion for driving the aquatic vehicle in a forwardly direction. When the device is to be turned, the occupant rotates the steering column 54 by the handlebar 52 which produces a lateral movement of the steering bar 60. The skis 70 interconnected to the steering bar 60 are pivoted accordingly and as the skis 70 pivot relative to the cross bar 84, the shafts 93 rotate to move the rudders 92 correspondingly therewith. The device turns in a corresponding direction and the rudders 92 act to stabilize the turning movement of the vehicle.

Referring to FIG. 9, a modified form of the stabilizing device is illustrated and includes the cross bar 84 and the vertical portion 86 joined thereto that is pivotally mounted on the plate 82 between the protuberances 90. The rudder 92 is mounted on a shaft 108 that has a sleeve 110 joined to the upper end thereof above the ski 70. A rod 112 is formed with a crank arm 114 that projects through the sleeve 110, the rod 112 being received in a sleeve 116 that is fixed to a member 118 secured to the cross bar 84. It is seen that reciprocating movement of the cross bar 76 in response to a steering action will pivotally move the skis 70 with respect to the fixed cross bar 84. As the ski 70 pivots, the crank 114 will be turned to rotate the shaft 108, thereby pivoting the rudder 92.

It is also contemplated to provide a simple ball and socket connection for the cross bar 76 and the cross bar 84; and as illustrated in FIG. 10, a socket 116 is fixed to a plate 117 mounted on the ski 70 and receives a ball member 119 therein that is mounted on the lowermost end of the vertical portion 86 of the cross bar 84. A similar socket 120 is fixed to the plate 117 and receives a ball 122 mounted on the end of the cross bar 76. Rotating movement of the skis 70 in response to a steering action of the handlebar 52 will cause the skis 70 to pivot in the manner as described hereinabove. A corresponding rotating movement of the rudder 92 located below the skis will also result as the shaft 93 is rotated.

Although not illustrated, it is contemplated to locate the motor 38 rearwardly of the seat 48; and in this connection the float 18 will be shifted rearwardly to accommodate the motor assembly 38 in the rear position thereof.

It is further contemplated that the floats 18 and 30 may be replaced by locating flotation material on the upper surfaces of the skis 70. In this connection flotation material indicated in phantom in FIG. 4, at 124,126 and 128 are mounted in spaced relation on the upper surface of the skis 70 and will provide sufficient buoyancy to support the components of the vehicle above the surface of the water even when the vehicle is in the rest position.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A self-propelled water recreational vehicle, comprising a main frame having a seat mounted thereon for receiving a rider, a forward support assembly secured to said main frame and depending therefrom, a rear support assembly secured to said main frame and depending therefrom and spaced from said forward support assembly, a pair of horizontally, spaced, parallel skis interconnected to said support assemblies for pivotal movement with respect thereto and extending substantially the full length of said frame, steering means mounted on said main frame adjacent to said seat and interconnected to said skis, said steering means being operable by said rider for producing a pivotal movement of said skis for effecting a required steering action for said vehicle, buoyant means secured to said main frame for supporting said main frame and skis in water in the position of rest thereof, a rudder located beneath each of said skis, said rear support assembly including a cross member interconnected to said skis and in pivotal relation thereto, a linkage connecting each said rudder to said cross member, and said linkage being responsive to a pivotal movement of said skis to produce a corresponding pivotal movement of said rudders for stabilizing the turning movement of said vehicle during the operation thereof.

2. A self-propelled water recreational vehicle as set forth in claim 1, power means for propelling said vehicle mounted on said main frame and including a propeller that projects beneath said skis.

3. A self-propelled water recreational vehicle as set forth in claim 2, said power means being mounted on said main frame forwardly of said steering means and adjacent to said forward support assembly.

4. A self-propelled water recreational vehicle as set forth in claim 3, said buoyant means including forward and rearward floats that are secured to said main frame, said forward float being located forwardly of said power means, and rearward float being located rearwardly of said seat.

5. A self-propelled water recreational vehicle as set forth in claim 1, said steering means including a steering column and a steering bracket joined to said steering column, said forward support assembly including a steering cross bar interconnected to said steering bracket and being pivotally connected to said skis, wherein a turning movement of said steering column produces a pivotal movement of said bracket, a longitudinal movement of said steering cross bar and a pivotal movement of said skis, and pivotal means interconnecting said skis for orienting the pivotal movement thereof so that the skis are simultaneously pivoted in corresponding relation.

6. A self-propelled water recreational vehicle as set forth in claim 1, said linkage including a vertical shaft joined to a rudder and a horizontal arm joined to said shaft, a ball mounted on an end of said horizontal arm and being received in a socket joined to said cross member, wherein pivotal movement of said skis about a horizontal axis is translated into pivotal movement of each rudder about a vertical axis.

7. A self-propelled water recreational vehicle as set forth in claim 1, said linkage including an arm having a vertical shaft joined to a rudder, a crank arm interconnected to said shaft and being slidably mounted in a sleeve secured to said rear support assembly, wherein pivotal movement of said skis about a horizontal axis is translated into pivotal movement of each rudder about a vertical axis.

8. A self-propelled water recreational vehicle as set forth in claim 1, said rear support assembly further including a second cross bar and said front support assembly including a steering cross bar, said cross bars interconnecting said skis and being interconnected thereto in pivotal relation.

9. A self-propelled water recreational vehicle as set forth in claim 8, the interconnection of each cross bar to the ski including a ball mounted on an end of each cross bar and a socket secured to the uppermost surface of the ski, each ball being received in its respective socket and providing for pivotal movement of the skis with respect to each other.

* * * * *